G. F. S. Wright,
Circular Saw Mill.
N° 16,424.   Patented Jan. 13, 1857.

UNITED STATES PATENT OFFICE.

G. F. S. WRIGHT, OF BLACK OAK, SOUTH CAROLINA.

METHOD OF MOUNTING AND GUIDING CIRCULAR SAWS.

Specification of Letters Patent No. 16,424, dated January 13, 1857.

*To all whom it may concern:*

Be it known that I, G. F. S. WRIGHT, of Black Oak, in the district of Charleston and State of South Carolina, have invented a new and Improved Spring Attachment to be Applied to the Arbors of Circular Saws; and I do hereby declare that the following is a full, clear, and exact description of the same, reference being had to the annexed drawings, making a part of this specification, in which—

Figure 1:
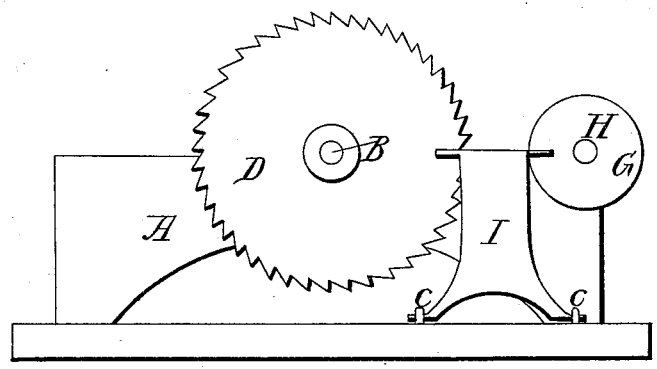
Figure 2:
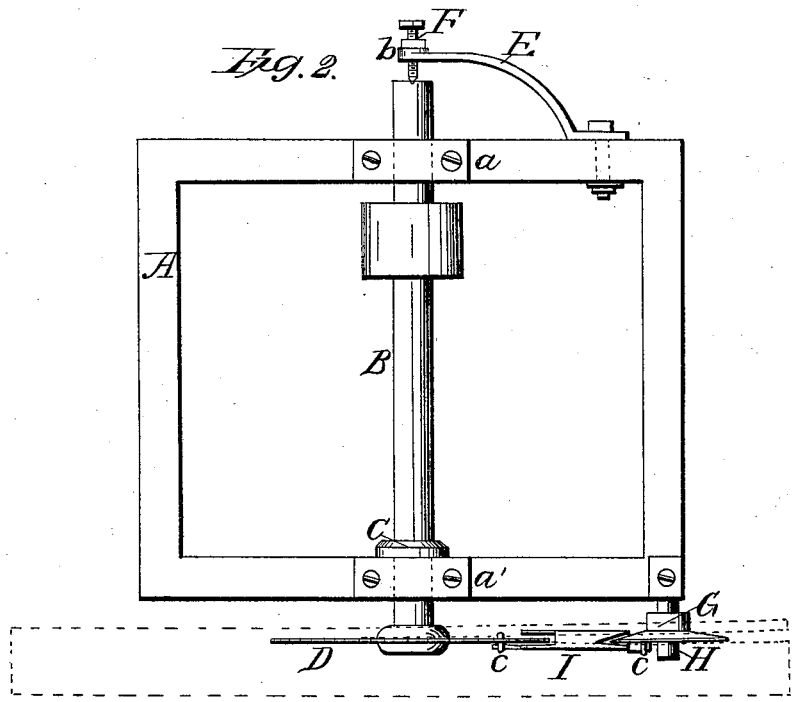

Figure 1, is a side view of a circular saw and rotating wedge. Fig. 2, is a plan or top view of ditto showing my improvement.

Similar letters of reference indicate corresponding parts in the two figures.

My invention consists in attaching a spring to one side of the frame in which the saw is placed, and having an adjustable screw pass through the end of said spring, the end of the screw bearing against one end of the saw arbor as will be hereinafter fully shown and described, whereby a lateral play or movement is allowed the saw, so that the saw and log will always be in line.

My invention also consists in using in connection with the spring above-mentioned an adjustable guide for regulating the position of the rotating wedge and keeping it in line with the saw.

To enable those skilled in the art to fully understand and construct my invention I will proceed to describe it.

A represents a frame on which the saw arbor B is placed, the arbor working in proper bearings (*a*) (*a'*).

C represents a shoulder on the arbor B, and D is the circular saw placed on one end of the arbor.

E represents a spring which is attached to one side of the frame A. This spring has a screw F passing through its outer end, a nut (*b*) being on the screw so that it may be adjusted farther in or out and secured at any desired point. The inner end of the screw F bears against the end of the arbor B and keeps the shoulder C pressed against the inner side of the bearing (*a'*) as shown clearly in Fig. 2.

G represents a rotating wedge which is placed loosely on an arm H attached to the frame A. This wedge is of the usual construction and therefore does not require a minute description.

I represents a plate, the lower end of which is fitted at each end in staples (*c*) attached to the base of the frame A. The upper end of this plate is bent over horizontally, and is slotted at each end to receive the wedge and saw. The plate it will be seen serves as a guide and forms a connection between the saw and wedge so that as the saw is moved laterally, the wedge which is allowed to slide on its arm H, will be moved in a corresponding manner, and the saw and wedge will always be kept in line with each other, the wedge of course being in the saw kerf.

From the above description of parts it will be seen that the saw is allowed a lateral movement or play inward or toward the frame A, and is thereby enabled to conform to any lateral movement of the log, and if the saw moves laterally outward from the frame, the wedge G prevents the slab from binding against the saw. The saw is prevented from heating and as the pressure of the spring E is constant the shoulder C is always kept snugly against the bearing *a'*, consequently there will be no unnecessary play produced by wear. The pressure of the spring against the arbor may be regulated by adjusting the screw F.

I am aware that several devices have been employed for giving a lateral play or movement to saw arbors, and springs are employed but differently arranged from mine.

Having thus described my invention what I claim as new and desire to secure by Letters Patent is,

1. The employment or use of the spring E applied to the machine as shown in connection with the shoulder C on the saw arbor B for the purpose set forth.

2. I further claim the guide I arranged or connected with the saw D and rotating wedge G as described when used in connection with the spring E for the purpose specified.

G. F. S. WRIGHT.

Witnesses:
SAML. R. WONDRUM,
F. L. PHELPS.